J. HUDSON.

Hame-Attachments.

No. 8,748. Reissued June 10, 1879.

Witnesses:

George E. Frost

D. Boardman

Inventor:

John Hudson

Keggett and Keggett

Attys

N. PETERS, PHOTO-LITHOGRAPHER, WASHINGTON, D. C.

UNITED STATES PATENT OFFICE.

JOHN HUDSON, OF DETROIT, MICHIGAN.

IMPROVEMENT IN HAME ATTACHMENTS.

Specification forming part of Letters Patent No. 191,591, dated June 5, 1877; Reissue No. 8,748, dated June 10, 1879; application filed November 25, 1878.

*To all whom it may concern:*

Be it known that I, JOHN HUDSON, of the city of Detroit, in the county of Wayne and State of Michigan, have invented a new and useful Improvement in Hame-Strap Attachments, of which the following is a specification.

The nature of this invention relates to a new and improved construction of a device for the double purpose of fastening buckles to such straps as are usually made with two leather loops—viz., front and back—and of supplying said loops, while at the same time it, when properly attached to a strap, fully performs the function of a hame-fastener; and has for its object to save the stitching of the overlaps and the putting in of leather loops, thereby overcoming the danger of ripping and the consequent pulling out of loops, and to prevent the buckle of the hame-strap from drawing around to the opposite hame while drawing upon it for the purpose of tightening the hames.

With this end in view the invention consists of a plate adapted to be firmly secured to the hame-strap, and formed with a hook end, which lies within the strap-loop when attached to the hame-eye, said plate being provided with two metallic loops, adapted for the passage, respectively, of the upper and lower folds of the strap.

Figure 1:
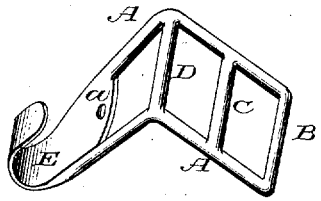
Figure 2:
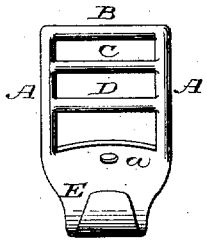
Figure 3:
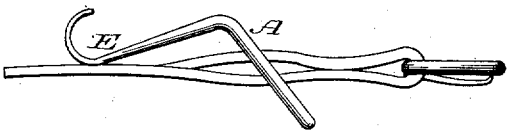
Figure 4:
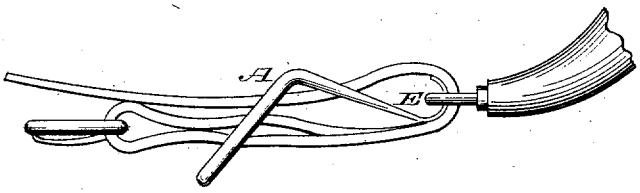
Figure 5:
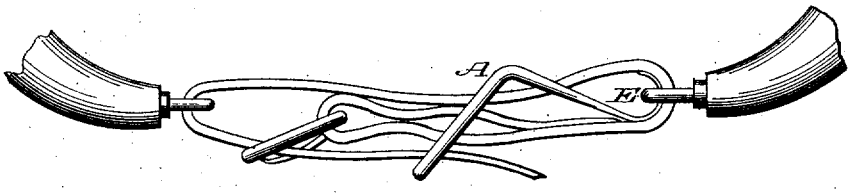

Figure 1 is a perspective view of my improved hame-strap attachment. Fig. 2 is a plan view of the same. Fig. 3 is a side view of the same with a strap attached, having a buckle on and ready for use. Fig. 4 is a like view, showing a section of a hame with my improved attachment connected and the strap passed through the back loop of the attachment. Fig. 5 is also a side view, showing sections of both hames with the strap and my improved attachment as they appear when in use.

Like letters refer to like parts in each figure.

In the drawings, A represents the sides of my improved hame-strap attachment. B is the front loop. C is the center bar. D is the back loop; and E is the hook, which is provided with a hole, *a*, designed for a rivet with which to fasten the whole firmly to the strap, the whole of the parts A, B, C, D, and E being preferably cast in one piece.

The strap is prepared in the usual manner. After putting the buckle on, a hole is punched through the doubled strap as near to the buckle as practicable, and a rivet put through and firmly fastened down. The strap thus prepared is passed through my improved attachment, the grain side of the leather being turned toward the front loop, B, the center bar, C, passing between the two plies of leather, and being pressed up as closely as possible to the aforesaid rivet. Another hole is then punched through the two plies of the strap, coincident to the hole *a* in the hook E, a rivet put through, and the whole riveted fast together.

The strap is put into the hame in the usual way. The hook E passes through the bail in the hame and receives the wear instead of the strap.

What I claim as my invention, and desire to secure by Letters Patent, is—

1. A hame-strap attachment consisting of a plate adapted to be firmly secured to the hame-strap, and formed with a hook end, which lies within the strap-loop when attached to the hame-eye, said plate being provided with two metallic loops, adapted for the passage, respectively, of the upper and lower folds of the strap, substantially as set forth.

2. The combination of the sides A, the front loop, B, the center bar, C, the back loop, D, and the hook E, having hole *a*, substantially as shown, and for the purpose herein set forth and described.

In testimony that I claim the above as my invention I have hereunto set my hand this 7th day of December, 1878.

JOHN HUDSON.

Witnesses:

GEORGE E. FROST,

D. GOODWIN.